United States Patent [19]

Kobayashi et al.

[11] Patent Number: 4,780,737

[45] **Date of Patent: * Oct. 25, 1988**

[54] AUTOMATIC PROCESSING MACHINE FOR LIGHT-SENSITIVE COLOR PHOTOGRAPHIC MATERIAL

[75] Inventors: Kazuhiro Kobayashi; Shigeharu Koboshi; Satoru Kuse; Kazuyoshi Miyaoka; Masayuki Kurematsu, all of Hino, Japan

[73] Assignee: Konishiroku Photo Industry Co., Ltd., Tokyo, Japan

[ * ] Notice: The portion of the term of this patent subsequent to Nov. 10, 2004 has been disclaimed.

[21] Appl. No.: 118,741

[22] Filed: Nov. 6, 1987

Related U.S. Application Data

[63] Continuation of Ser. No. 743,958, Jun. 12, 1985, Pat. No. 4,705,377.

[30] Foreign Application Priority Data

Jun. 18, 1984 [JP] Japan ............................... 59-124637

[51] Int. Cl.$^4$ ............................................... G03B 3/02

[52] U.S. Cl. .................................... 354/322; 354/299; 354/324; 15/100

[58] Field of Search ............... 354/316, 320, 321, 322, 354/324, 299; 134/64 P, 122 P; 15/100

[56] References Cited

U.S. PATENT DOCUMENTS 3,388,653 6/1968 Mayfield .
3,620,725 11/1971 Kosta .
3,978,506 8/1976 Geyken et al. ...................... 354/324
4,060,873 12/1977 Leuchter .............................. 15/100
4,081,816 3/1978 Geyken et al. ...................... 354/324
4,174,901 11/1979 Takita et al. .................... 134/122 P
4,239,367 12/1980 Hope et al. ......................... 354/322
4,295,728 10/1981 Nishimoto ....................... 134/122 P
4,429,982 2/1984 Martino et al. ..................... 354/324
4,451,132 5/1984 Kishimoto .......................... 354/324
4,502,772 3/1985 Mihara ............................... 354/322
4,533,225 8/1985 Shiga ................................. 354/322

FOREIGN PATENT DOCUMENTS 2361150 6/1975 Fed. Rep. of Germany .

*Primary Examiner*—A. A. Mathews
*Attorney, Agent, or Firm*—Frishauf, Holtz, Goodman & Woodward

[57] ABSTRACT

Disclosed is an automatic processing machine for a light-sensitive color photographic material, having a color developing tank as the formost tank of the processing tanks and a stabilizing tank as the last tank of the processing tanks, which comprises having a system for conveying a light-sensitive material which will not bring the stabilizing liquid components filled in the stabilizing tank into the color developing solution filled in the color developing tank.

According to the automatic processing machine of the present invention, the technical task can be solved as a matter of course, and moreover no requirement for piping, no discharging of waste solutions of processing and its small size will result in exhibiting such effects that it can be installed on a floor of higher stage and also be moved, if necessary.

20 Claims, 4 Drawing Sheets

AUTOMATIC PROCESSING MACHINE FOR LIGHT-SENSITIVE COLOR PHOTOGRAPHIC MATERIAL

This is a continuation of application Ser. No. 743,958, filed June 12, 1985, now U.S. Pat. No. 4,705,377.

BACKGROUND OF THE INVENTION

This invention relates to an automatic processing machine to be used for processing of a light-sensitive color photographic material. More particularly, it pertains to an automatic processing machine for a light-sensitive color photographic material constituted substantially of processing tanks for color developing, bleach-fixing and stabilizing processing, having substantially no water washing tank.

In photographic processing, when the light-sensitive photographic material to be processed is for color, it is constituted to carry out automatically the steps of, for example, color developing, bleaching, fixing, water washing and stabilization, and sometimes bleaching and fixing may be conducted in the bleach-fixing processing in a both endowed with both functions. In photographic processing, there is the method of batch system processing, in which a processing solution in an amount necessary for development is housed in a processing tank such as color developing tank and developoment is effected while immersing a light-sensitive color photographic material in the processing solution in this tank. This is generally called as the tank development. According to this method, water washing is performed with pooled water, but it generally involves the drawback to impair stability of the color dye, and there is also the drawback that the color developing solution will be fatigued after 2 to 3 times of processing to be changed in color developing characteristics. To compensate for this drawback, there is the method in which processing is performed while supplementing the components consumed corresponding to the fatigue, but it is difficult to process stably a large amount of light-sensitive color photographic materials according to this batch processing. For this reason, it has generally been practiced to maintain always constantly the finished photographic performance by supplementing successively the components consumed while processing continuously the photographic materials, thereby maintaining the processing solution components at constant levels.

On the other hand, similarly as such photographic characteristics, durable storability of dyes in color photography is also an important characteristic, and it is presently very commonly accepted to maintain the durable storability by performing sufficient water washing processing. Accordingly, in commercial continuous color photographic processing, a large amount of water is required, and the amount of discharged water is also large, whereby the conditions of location affording supplying and discharging of large amounts of washing water have been required.

Whereas, in these days, the cost of civil tap water is increasing abruptly due to elevation in the development cost of water, and also the cost in discharging sewage water is also continuing to be increased. Such an elevation in cost of water may be due to merely an economical reason, but, on the other hand, in large cities with great populations, it is really occurring that supply cannot pace up with expanded demand. Thus, water resource, which has been said to be infinite, is now coming to the era of finiteness, and shortage of water leading to limited water supply is really occurring somewhere in Japan. In such a district, the situation is so serious as lacking for drinking water or laundering water, and it may be considered to be difficult to ensure washing water in photographic processing. And, in large cities, a water-saving type society is going to be created, in which people are not tolerant enough to afford use of a large quantity of water for washing in photographic processing.

Also, generally speaking, around these respective automatic processing machines, working spaces of desired vastness are necessary, in which works such as control of supplementing cocks, calibration of evaporation, exchange of processing solutions and dissolution of supplemental solutions are conducted. It is not desirable to have tap water piping for washing water or piping for discharged solution at the feet of these workers, because they are dangerous in working environment. Further, for installing newly or moving an automatic processing machine, piping construction is necessarily required, for which time and cost are necessary. For this reason, it would be desirable to have an automatic processing machine having a discharged solution recovery tank.

Further, as another tendency in recent years, the color automatic development processing is shifting from a large scale laboratory processing to a small size laboratory processing, and the so-called mini-laboratories with smaller amounts of processing are rapidly increasing. In such small size laboratories, miniaturization of an automatic developing machine is strongly desired. And, in such a small scale automatic processing machine, in addition to the demand for enabling omission of tap water piping for water washing, there is the demand for also omitting the piping for permitting the discharged processing solutions discharged from respective processing tanks to flow into the sewage waterway, and the volume of the discharged solution recovery tank is desired to be made as small as possible for this purpose.

And, the processing methods to perform stabilizing processing immediately after bleach-fixing or fixing processing without performing washing with water have been proposed by the present Applicant in Japanese Provisional Patent Publications Nos. 14834/1983, 34448/1983, 132146/1982 and 18631/1983, etc. in which counter-measures to overcome the above problems are clarified. However, as the result of the study by the present inventors, these methods were also found to involve various problems. For example, in the water washings of the prior art, since a large amount of water is employed, the preceding bath components brought in attached on the light-sensitive materials are considerably diluted therewith. Accordingly, the discharged solution could be discharged as such into rivers or sewage waterways. Whereas, in performing the above stabilizing processing, a large amount of the preceding bath components will become accumulated in the stabilizing processing solution, and therefore the discharged solution cannot be discharged as such into rivers or sewage waterways as prohibited by statutory regulations in pollution. For this reason, the discharged solutions must be recovered by specialists in disposal of discharged solutions with payment of recovery fees. Consequently, while no cost required for washing water may be necessary, an enormous amount of cost becomes necessary for disposal of said discharged solution.

Further, according to the study by the present inventors, the following problems have been found to be involved.

That is, during conveying light-sensitive materials by a conveying means such as a conveying belt or conveying rolls, if said conveying means is constituted of an endless belt, the stabilizing solution components filled in the stabilizing tank which is the final tank of the processing tanks is brought by the said endless belt into the color developing tank which is the foremost tank of the processing tanks to be accumulated therein, thereby changing the component ratio of said color developing solution, even accelerating deterioration (air oxidation) of the solution, ultimately affecting markedly bad influences on photographic performance. Thus, it has been found difficult to lower the amount of the solution supplemented to the color developing solution at a certain level or lower. This means that there is a limit in reduction of the amount of the discharged solution accompanied with supplement of the processing solution, thus indicating that the volume of the discharged solution recovery tank provided for the demand for prevention of pollution or the demand for silver recovery cannot be reduced and also that the tank recovery frequency cannot be reduced. Such a fact poses no problem in automatic processing machines of the prior art provided with a water washing processing tank with running water as the final tank of the processing tanks, and it is a problem inherent in the automatic processing machine which performs stabilizing processing as substituted for water washing as in the present invention.

SUMMARY OF THE INVENTION

The present invention has been accomplished under the state of the art as described above, and its technical tasks include; firstly, to enable developing processing of an automatic processing machine without tap water piping for washing with water; secondly, to prevent deterioration of photographic performance through entrainment of the stabilizing solution components in the color developing solution; thirdly, to enable reduction in the amounts supplemented of the color developing solution and the stabilizing solution; fourthly, to enhance safety higher by also removing the piping for discharged processing solutions which is dangerous in working environment; fifthly, to dispense with piping construction, thereby making new installation or movement of the device very easy; sixthly, to reduce environmental contamination by also enabling recovery of discharged processing solution; and seventhly, to necessitate no increase in frequency of recovery even when the tank for recovery of discharged solution which stores discharged processing solution may be miniaturized.

The automatic processing machines for light-sensitive color photographic materials of the present invention for overcoming the above technical tasks is an automatic processing machine for light-sensitive color photographic material, having a color developing tank as the foremost tank of the processing tanks and a stabilizing tank as the last tank of the processing tanks, which comprises having a system for conveying a light-sensitive material which will not bring the stabilizing liquid components filled in said stabilizing tank into the color developing solution filled in said color developing tank.

BRIEF DESCRIPTION OF THE DRAWINGS

FIG. 3 is practiced.

DESCRIPTION OF THE PREFERRED EMBODIMENTS

Figure 1:
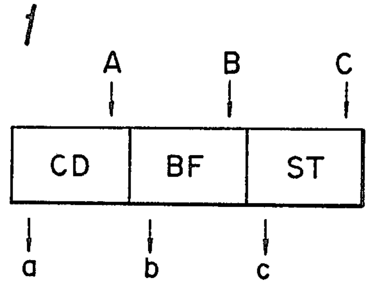
FIGS. 1 through 8 each is a block diagram showing the constitution of the processing tanks in the automatic processing machine according to the present invention.
Figure 2:
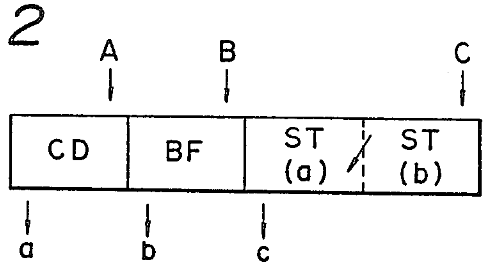

According to the preferred embodiments of the invention, the automatic processing machine is constituted to have a detachable discharged solution recovery tank which stores discharge solution from processing tanks, or alternatively have at least two discharged solution recovery tanks, one tank being a tank for storing the discharged solution from the color developing tank and the other being a tank for storing the discharged solution from the processing tank having fixing ability and the discharged solution from the stabilizing tank as a mixture (common use tank), or further the processing tank having fixing ability is a bleach-fixing tank. Also, it is preferred to provide no heat-exchange type cooling device with tap water in the color developing tank of the present invention.

The present invention is an automatic processing machine suitable for developing processing of a light-sensitive color photographic material, particularly one which can omit also tap water piping for water washing processing. That is, in place of water washing, a system using a stabilizing solution or a rinsing solution is employed, as disclosed in Japanese Provisional Patent Publications Nos. 14834/1983, 105145/1983, 134634/1983 and 18631/1983.

One example of the processing steps in the automatic processing machine of the present invention consists substantially of at least the three steps of color developing bleach-fixing and stabilizing processing substituting for water washing.

The automatic processing machine of the present invention prevents bringing of the stabilizing solution components into the color developing tank by employment of a system other than the endless belt system as the conveying system of light-sensitive materials. The conveying system preferably used in the present invention may include the short leader system, the leader or roller transport system, as disclosed in Japanese Provisional Patent Publications Nos. 60526/1976, 48746/1980 and 5544/1981, Japanese Utility Model Publications Nos. 27875/1980 and 39391/1980, and Japanese Provisional Utility Model Publications Nos. 90438/1982 and 205144/1982. As the preferred embodiments, there may be mentioned the method in which providing a leader at a head of a long light-sensitive material to be treated, and conveying the leader and/or passing said long light-sensitive material through a prescribed passage by pushing out or pulling said light-sensitive material using a roller or the like, or the method in which, without providing a leader at a head of a long light-sensitive material to be treated, conveying said light-sensitive material by pusing out or pulling it passing through a prescribed passage using a roller or the like. In addition to the above, it is also possible to use a system with a constitution having conveying rollers or conveying guides for light-sensitive materials which will not bring the stabilizing solution components filled in the above stabilizing tank into the color developing solution filled in the above color developing tank.

Each processing tank should preferably be constituted so as to afford a processing solution volume of not more than 50 liters. Here, the processing solution volume of not more than 50 liters represents the amount of the processing solution filled in practical processing, but when supplementing of the processing solution is performed intermittently, it represents the amount of the processing solution when filled fully in the tank. Supplementing of each processing solution may be performed when the solution quantity became 95% or less (more preferably 90% or less) of the fully filled volume of the processing solution. Also, each of the processing steps (baths) in the present invention should most preferably be a single tank, but it is not necessarily one tank. For the purpose of increasing the processing speed, two or more tanks may be employed, and the respective tanks may be connected to each other to permit freely respective processing solutions into other tanks. It is also possible to use the method connected by the so-called countercurrent system in which overflows flow countercurrently. Also, the processing may also consist of a plurality of processing solutions having separate functions. For example, the first color developing tank and the second color developing tank may be filled with processing solutions comprising different processing solutions from each other, and supplementing of the components consumed is done separately, and the tanks may also be separated from each other. Also, as for the stabilizing solution, the first stabilizing solution may contain a fungi-proof agent as the main component, the second stabilizing solution may contain a surfactant as the main component. Of course, also in this case, supplemental solutions are prepared separately and supplemented respectively. And, in the case of the "two or more divided processing tanks" constituted to permit inflow and outflow of solutions as mentioned above, only when the processing steps are the same, it is preferred that the "two or more divided processing tanks" as a whole should be constituted so as to afford a processing solution volume not more than 50 liters, but each tank with a processing solution volume of not more than 50 liters may also be available. When supplementing of solutions are performed separately as in the above relationship between the first stabilizing solution and the second stabilizing solution, the respective tanks are constituted independently of each other, and each processing tank should preferably be constituted to give a processing solution volume of not more than 50 liters, and each processing tank having a processing solution volume preferably of 40 liters or less, more preferably 30 liters or less, most preferably 20 liters of less.

The present invention is described in more detail below.

Typical examples of the processing tank constitution in the present invention are shown in FIGS. 1 through 8, in each of which, CD represents a color developing tank, BF a bleach-fixing tank, ST a stabilizing tank, BL a bleaching tank, Fix a fixing tank, STR a rinse stabilizing tank (see Japanese Pat. No. 254134/1985 filed on May 31, 1984, by the present Applicant) and Cond a conditioning tank, respectively, and the reference numerals 1, 2, . . . attached as suffixes to the symbols representing tanks of said respective tanks indicate that said tank is divided into two or more tanks with different solution compositions of the first tank, the second tank, . . . , and the letters such as (a), (b) . indicate the tanks in which the processing solutions with the same composition are filled.

In each Figure, the solid lines indicate that the respective tanks are substantially partitioned thereby, the broken line and the one-directional arrowhead that the adjacent tanks are connected by the countercurrent system, and the broken line and the two-directional arrowhead that the adjacent tanks are connected to each other by the system in which the solutions in the respective systems can freely be mixed. And, capital English letters A, B, C . . . indicate supplementing solutions for respective tanks, while small English letters a, b, c . . . overflow solutions from respective tanks.

Figure 3:
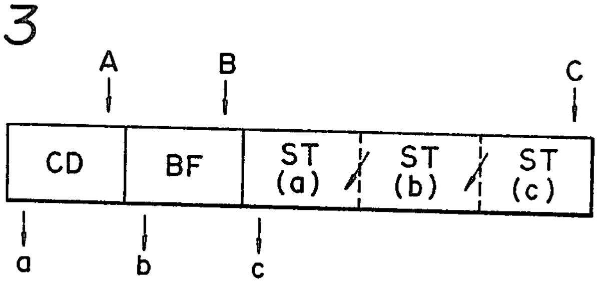
Figure 4:
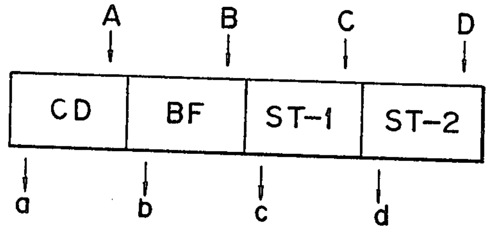
Figure 5:
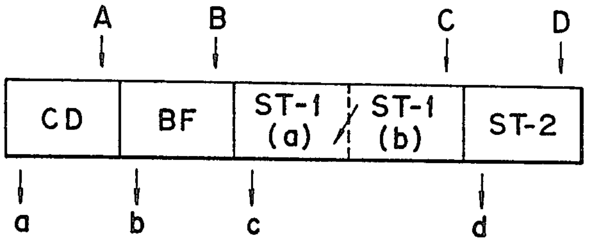
Figure 6:
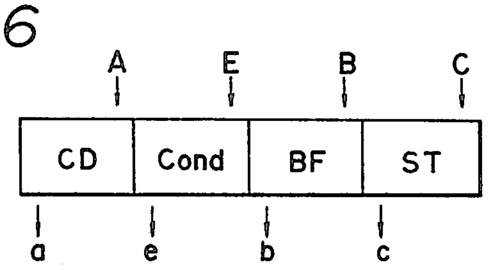
Figure 7:
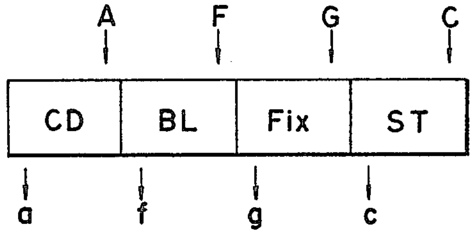
Figure 8:
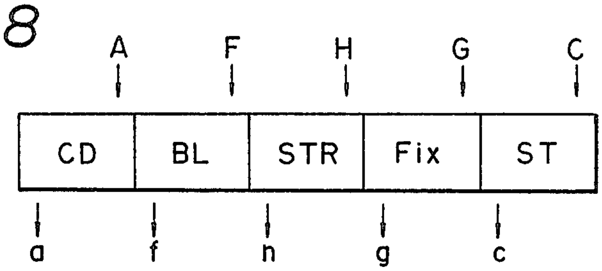

Desirable processing tank arrangements are as shown in the above FIGS. 1 through 8. Particularly, the embodiments of FIG. 4 and FIG. 5 are for use in color negative and characterized by using two kinds of stabilizing solutions, showing an example in which the stabilized solution is divided into the first stabilizing solution for the purpose of desalting the bleach-fixing solution components and the second stabilizing solution which exhibits the effect of the final water raining bath to prevent droplet irregularity.

The first stabilizing solution can be very small in supplemented amount to obtain the same level of desalting effect, although compactness may be lost in the case of two tanks as compared with the case of one tank. This is because desalting effect can be improved very much by the countercurrent system.

The automatic processing machine of the present invention having these processing tank arrangements is made to give a total amount of discharged solution which is 0.95-fold or less (preferably 0.9-fold or less, particularly preferably 0.8-fold or less) of the total amount of supplemented processing solution for the respective tanks. Any desired means may be used for doing so. For example, as described in the examples mentioned below, a panel for sealing, etc. may be used to make the whole processing tanks a sealed system simultaneously with provision of a ventilating fan to effect ventilation so as to promote evaporation of the processing solutions filled in the respective processing tanks. Also, evaporation may be promoted by making the respective processing solution temperatures to higher temperatures of 30° C. or higher (preferably 33° C. or higher). Further, the toal amount of discharged solution relative to the total amount of supplemented processing solution may be reduced by, for example, charging again a part or all of the discharged solution of the stabilizing solution into the stabilizing tank after regeneration treatment or utilizing it as the processing solution for other processing tanks such as the bleach-fixing solution or fixing solution. And, two or more of these means can be combined.

Next, by referring to the constitutions in FIGS. 1 through 8, examples of discharged solution recovery are to be explained. The discharged solutions c and b (or c and g) in FIGS. 1 through 8, and the discharged solution a are recovered and stored in separated discharged solution recovery tanks. In this case, the discharged solutions c and b may be recovered and stored in the same discharged solution recovery tank or alternatively in separate discharged solution recovery tanks. The discharged solutions d, e, f and h other than those as mentioned above in FIGS. 1 through 8 may be stored in the discharged solution recovery tank for the above discharged solution a, or in the discharged solution recovery tank for the above c and b (or c and g), or alternatively in an entirely different discharged solution recovery tank.

The discharged solution recovery tank to be used in the present invention is not necessarily required to be built in within the automatic processing machine body, but the present invention is also inclusive of the cases where it is installed at the bottom of the body, housed in a mounting stand, equipped in the vicinity of the body or equipped outside of the body.

Also, in the automatic processing machine of the present invention having various tank arrangements as described above, when the stabilizing solution is divided into the first stabilizing tank ST-1 and the second stabilizing tank ST-2, the discharged solution from the tank ST-1 nearer to the processing solution having fixing ability (bleach-fixing solution or fixing solution) should preferably be mixed with the processing solution having fixing ability to be stored (in one recovery tank), but both discharged solutions from ST-1 and ST-2 may also be mixed with the processing solution having fixing ability to be stored (in one recovery tank).

According to the present invention, for example, the processing solution volume ratio in respective porcessing tanks should preferably be made [CD tank]:[BF tank]: ST tank]=[1-2.5]:[]:[1-3], and, when ST tank is divided into two or more tanks, the processing solution volumes therein may be made approximately equal to each other.

The stabilizing solution should preferably be supplemented rather intermittently in large quantity on the basis of calculation of processed quantity than continuously in small quantity. For example, per processing of 70 to 120 sheets (preferably 80 to 100 sheets) of color paper E size (82 mm×17 mm), it is preferred to supplement the solution intermittently (successively) in a large quantity, namely, 2 to 3 ml per one sheet of E size.

The method for calculating the amount of the light-sensitive materials processed may be any desired method. For example, with the conveying speed of the light-sensitive materials being made constant, calculation may be made from detection and measurement of the width of the processed light-sensitive material and the processing time, whereby the processed amount can be obtained as the processed area of the light-sensitive material.

The amount of the stabilizing solution supplemented in the present invention may be, for example, preferably [CD supplemental amount]:[ST supplemental amount]=[1]:[1-4], more preferably [1]:[1-3].

In the following, the processing solutions to be used in the respective processing tanks are to be explained.

In the present invention, the color developing processing step refers to the step for forming a color image, more specifically the step for forming a color image through the coupling reaction between the oxidized product of a color developing agent and a color coupler.

Accordingly, in the color developing processing step, it is generally required to incorporate a color developing agent in the color developing solution, and this step is also inclusive of using a color photographic material containing a color developing agent therein and processing with a color developing solution or an alkali solution (activator solution) containing a color developing agent.

The color developing agent contained in the color developing solution may be an aromatic primary amine color developing agent, including aminophenol type and p-phenylenediamine type derivatives. These color developing agents may be used in the form of organic acids and inorganic acids, such as chlorides, sulfates, phosphates, p-toluenesulfonates, sulfites, oxalates, benzenedisulfonates, etc.

These compounds may be used generally at concentrations of about 0.1 g to about 30 g per liter of the color developer, more preferably about 1 g to about 15 g per liter of the color developing solution. At a level lower than 0.1 g, no sufficient color developed density can be obtained.

The processing solution temperature in the color developing tank may preferably be 10° C. to 65° C., more preferably 25° C. to 45° C. to promote evaporation and process.

The above aminophenol type developing agent may include, for example, o-aminophenol, p-aminophenol, 5-amino-2-oxytoluene, 2-amino-3-oxy-toluene, 2-oxy-3-amino-1,4-dimethylbenzene and the like.

Particularly useful primary aromatic amine type color developing agents are N,N'-dialkyl-p-phenylenediamine compounds, in which alkyl groups or phenyl groups may be either substituted or unsubstituted. Among them, examples of particularly useful compounds are N,N'-dimethyl-p-phenylenediamine hydrochloride, N-methyl-p-phenylenediamine hydrochloride, N,N'-dimethyl-p-phenylenediamine hydrochloride, 2-amino-5-(N-ethyl-N-dodecylamino)-toluene, N-ethyl-N-β-methanesulfonamidoethyl-3-methyl-4-aminoaniline sulfate, N-ethyl-N-β-hydroxyethylaminoaniline, 4-amino-3-methyl-N,N'-diethylaniline, 4-amino-N-(2-methoxyethyl)-N-ethyl-3-methylaniline-p-toluenesulfonate and the like.

The above color developing agents may be used either alone or in combination of two or more compounds. Further, the above color developing agent may be included within the color photographic material. For example, there may be employed the method in which a color developing agent is included in the form of a metal salt as disclosed in U.S. Pat. No. 3,719,492; the method in which a color developing agent is included in the form of Schiff's salt as disclosed in U.S. Pat. No. 3,342,559 and Research Disclosure No. 15159, 1976; the method in which it is included as a dye precursor as disclosed in Japanese Provisional Patent Publications Nos. 65429/1983 and 24137/1983; or the method in which it is included as a color developing agent precursor as disclosed in U.S. Pat. No. 3,342,597. In this case, it is also possible to process the light-sensitive silver halide color photographic material with an alkali solution (activator solution) in place of the color developing solution, and immediately subjected to bleach-fixing processing after the alkali solution processing. The color developing solution to be used in the present invention may include alkali agents usually employed in developing solutions, such as sodium hydroxide, potassium hydroxide, ammonium hydroxide, sodium carbonate, potassium carbonate, sodium sulfate, sodium metaborate, borax or the like, and may also contain various additives as exemplified by benzyl alcohol, alkali metal halides such as potassium bromide or potassium chloride, etc., or developing controllers such as citrazinic acid, etc., preservatives such as hydroxylamine or sulfites, etc. Further, various defoaming agents and surfactants or organic solvents such as methanol, dimethylformamide or dimethyl sulfoxide, etc. may also be contained in the developer, if desired.

The pH value of the color developing solution employed in the present invention should be usually 7 or higher, preferably about 9 to 13.

The color developing solution to be used in the present invention may also incorporate optionally antioxidants such as diethylhydroxyamine, tetronic acid, tetronimide, 2-anilinoethanol, dihydroxyacetone, aromatic secondary alcohols, hydroxamic acid, pentose or hexose, pyrogallol-1,3-dimethyl ether and the like.

In the color developing solution to be used in the present invention, various chelating agents may be used in combination as sequestering agents. For example, said chelating agents may include aminopolycarboxylic acids such as ethylenediaminetetraacetic acid, diethylenetriaminepentaacetic acid, etc., organic phosphonic acids such as 1-hydroxyethylidene-1,1'diphosphonic acid, etc., aminopolyphosphonic acids such as aminotri(methylenephosphoric acid) or ethylenediaminetetraphosphoric acid, etc., oxycarboxylic acids such as citric acid or gluconic acid, etc., phosphonocarboxylic acids such as 2-phosphonobutane-1,2,4-tricarboxylic acid, etc., polyphosphoric acids such as tripolyphosphoric acid or hexametaphosphoric acid, etc., polyhydroxy compounds and others.

In the present invention, the bleach-fixing step refers to the step in which the metallic silver formed by development is oxidized into a silver halide, followed by formation of a water-soluble complex simultaneously with color formation of the non-color formed portion of the color forming agent.

The metal complex of an organic acid as the bleaching agent to be used in the bleach-fixing solution is a complex of a metal ion such as iron, cobalt, copper, etc, coordinated with an organic acid such as aminopolycarboxylic acid, oxalic acid or citric acid, etc. The most preferable organic acid to be used for formation of such a metal complex of organic acid may include polycarboxylic acids or aminopolycarboxylic acids. These polycarboxylic acids or aminopolycarboxylic acids may be alkali metal salts, ammonium salts or water-soluble amine salts. Specific examples of these compounds may include the followings.

[1] Ethylenediaminetetraacetic acid
[2] Diethylenetriaminepentaacetic acid
[3] Ethylenediamine-N-(β-oxyethyl)-N,N',N'-triacetic acid
[4] Propylenediaminetetraacetic acid
[5] Nitrilotriacetic acid
[6] Cyclohexanediaminetetraacetic acid
[7] Iminodiacetic acid
[8] Dihydroxyethylglycinecitric acid (or tartaric acid)
[9] Ethyl ether diaminetetraacetic acid
[10] Glycol ether diaminetetraacetic acid
[11] Ethylenediaminetetrapropionic acid
[12] Phenylenediaminetetraacetic acid
[13] Disodium ethylenediaminetetraacetate
[14] Tetra(trimethylammonium) ethylenediaminetetraacetate
[15] Tetrasodium ethylenediaminetetraacetate
[16] Pentasodium diethylenetriaminepentaacetate
[17] Sodium ethylenediamine-N-(β-oxyethyl)-N,N'N'-triacetate
[18] Sodium propylenediaminetetraacetate
[19] Sodium nitriloacetate
[20] Sodium cyclohexanediaminetetraacetate These bleaching agents may be used in amounts of 5 to 450 g/l, more preferably 20 to 250 g/l.

For the bleach-fixing solution, there may be applied a solution with a composition containing a silver halide fixing agent in addition to the bleaching agent as described above and also containing optionally a sulfite as the preservative. It is also possible to use a bleach-fixing solution comprising a composition in which an ethylenediaminetetraacetic acid iron (III) complex bleaching agent and a small amount of halides such as ammonium bromide which differ from the above-mentioned silver halide fixing agent are added, or a bleach-fixing solution comprising a composition in which, on the contrary, a large amount of a silver halide such as ammonium bromide is added, and further a special bleach-fixing solution with a composition comprising a combination of an ethylenediaminetetraacetic iron (III) complex and a large amount of halides such as ammonium bromide, etc. As the aforesaid halides, there may be employed, other than ammonium bromide, hydrochloric acid, hydrobromic acid, lithium bromide, sodium bromide, potassium bromide, sodium iodide, potassium iodide, ammonium iodide and the like.

As the silver halide fixing agent to be contained in the bleach-fixing solution as mentioned above, there may be employed compounds capable of forming water-soluble complexes by reaction with silver halide employed for an usual fixing process, as exemplified typically by thiosulfates such as potassium thiosulfte, sodium thiosulfate, ammonium thiosulfate, etc., thiocyanates such as potassium thiocyanate, sodium thiocyanate, ammonium thiocyanate, etc., thiourea and thio ether. These fixing agents may be employed in amounts of 5 g/l or more which can be dissolved, but generally from 70 g to 250 g/l.

The bleach-fixing solution may also contain various kinds of pH buffering agents such as boric acid, borax, sodium hydroxide, potassium hydroxide, sodium carbonate, potassium carbonate, sodium bicarbonate, potassium bicarbonate, acetic acid, sodium acetate, ammonium hydroxide, etc., either alone or in a combination of two or more kinds. Further, various fluorescent whitening agents, deforming agents or surfactants may also be incorporated. In addition, it is also possible to incorporate suitably preservatives such as hydroxylamine, hydrazine, bisulfite adducts of aldehyde compounds, etc., organic chelating agent such as aminopolycarboxylic acids, etc., stabilizers such as nitro alcohol, nitrates, etc., organic solvents such as methanol, dimethylsulfoamide, dimethylsulfoxide, etc.

In the bleach-fixing solution to be used in the present invention, there may be added various bleaching accelerators as disclosed in Japanese Provisional Patent Publication No. 280/1971, Japanese Patent Publications Nos. 8506/1970 and 556/1971, Belgian Patent No. 770,910, Japanese Patent Publications Nos. 8836/1970 and 9854/1978, Japanese Provisional Patent Publications Nos. 71634/1979 and 42349/1974.

The bleach-fixing solution is used at a pH 4.0 or higher, but generally at a pH 5.0 to pH 9.5, desirably at a pH 6.0 to pH 8.5, most preferably at a pH 6.5 to pH 8.5. The processing temperature may be 80° C. or lower, and lower by 3° C. or more, preferably 5° C. or more, than the processing temperature in the color developing tank, but desirably at 35° C. or lower, while suppressing evaporation, etc.

The stabilizing processing to be used in the present invention is substitute for washing with water, referring to the image stabilizing processing as disclosed in the above-mentioned Japanese Provisional Patent Publication No. 134636/1983 and otherwise in Japanese Provisional Patent Publication No. 126533/1984 and others, which obviates water washing processing. Accordingly, the processing bath is not necessarily called stabilizing processing bath.

The stabilizing solutions may also have the function of processing for stabilization of color images and the function of a water draining bath for prevention of contamination such as water washing irregularity. Otherwise, there may also be included coloring controlling solutions for coloring color image and antistatic solutions containing antistatic agents in these stabilizing solution. In stabilizing solutions, when bleach-fixing components are brought thereinto from the receding bath, contrivances are made to avoid storability of dyes by neutralizing, desalting and deactivating these components.

The components to be incorporated in such a stabilizing solution may include chelating agents having a chelate stabilization coefficient with iron ions of 6 or higher (particularly preferably 8 or higher). These chelating agents may include organic carboxylic acid chelating agents, organic phosphoric acid chelating agents, polyhydroxylic compounds, inorganic phosphoric acid chelating agents, etc. Among them, preferable chelating agents are ethylenediamine-di-ortho-hydroxyphenylacetic acid, nitrilotriacetic acid, hydroxyethylenediaminetriacetic acid, diethylenetriaminepentaacetic acid, hydroxyethyliminediacetic acid, diaminopropanoltetraacetic acid, ethylenediaminetetrakismethylenephosphonic acid, nitrilotrimethylenephosphonic acid, 1-hydroxyethylidene-1,1'-diphosphonic acid, 1,1'-diphosphonoethane-2-carboxylic acid, 2-phosphonobutane-1,2,4-tricarboxylic acid, 1-hydroxy-1-phosphonopropane-1,2,3-tricarboxylic acid, catechol-3,5-disulfonic acid, sodium pyrophosphate, sodium tetrapolyphosphoric acid, sodium hexametaphosphoric acid and the like. For the effect of the present invention, particularly preferred are diethylenetriaminepentaacetic acid, 1-hydroxyethylidene-1,1'-diphosphonic acid and salts thereof.

These compounds may be used at concentrations of about 0.1 g to 10 g per liter of the stabilizing solution, more preferably at concentrations of about 0.5 g to 5 g per liter of the stabilizing solution.

Particularly desirable compounds to be added into the stabilizing solution of the present invention may include ammonium compounds. These can be supplied from ammonium salts of various inorganic compounds, including specifically ammonium hydroxide, ammonium bromide, ammonium carbonate, ammonium chloride, ammonium hypophosphite, ammonium phosphate, ammonium phosphite, ammonium fluoride, acidic ammonium fluoride, ammonium fluoroborate, ammonium arsenate, ammonium hydrogen carbonate, ammonium hydrogen fluoride, ammonium hydrogen sulfate, ammonium sulfate, ammonium iodide, ammonium nitrate, ammonium pentaborate, ammonium acetate, ammonium adipate, ammonium taurinetricarboxylate, ammonium benzoate, ammonium carbamate, ammonium citrate, ammonium diethyldithiocarbamate, ammonium formate, ammonium hydrogen malate, ammonium hydrogen succinate, ammonium hydrogen phthalate, ammonium hydrogen tartarate ammonium lactate, ammonium malate, ammonium maleate, ammonium oxalate, ammonium phthalate, ammonium picrate, ammonium pyrollidinedithiocarbamate, ammonium salicylate, ammonium succinate, ammonium sulfanilate, ammonium tartarate, ammonium thioglycolate, ammonium 2,4,6-trinitrophenol and the like.

These ammonium compounds may be added in amounts within the range of from 0.05 to 100 g, preferably from 0.1 to 20 g, per liter of the stabilizing solution.

Further, desirable compounds to be added in the stabilizing solution of the present invention may include pH controllers such as acetic acid, sulfuric acid, hydrochoric acid, nitric acid, sulfanilic acid, potassium hydroxide, sodium hydroxide, ammonium hydroxide, etc.; fungi-proof agents such as sodium benzoate, butyl hydroxy benzoate, antibiotics, dehydroacetic acid, potassium sorbate, thiapentazole, o-phenylphenol, etc.; preservatives such as 5-chloro-2-methyl-4-isothiazoline-3-one, 2-octyl-4-isothiazoline-3-one, 1,2-benzisothiazoline-3-one, water-soluble metal salts, etc.; dispersants such as ethylene glycol, polyethylene glycol, polyvinyl pyrrolidone (PVP K-15, Rubiscol K-17, etc.); film hardeners such as formalin, etc.; fluorescent whitening agents; and so on.

Among these additive comounds, the most effective are ammonium compounds discribed in Japanese Provisional Patent Publication No. 184345/1984. These act to control the pH in the image coating to weakly acidic as optimal for storage. As the compound preferably used together with an ammonium compound, there is an acid, more preferably sulfuric acid and hydrochloric acid.

The pH value of the stabilizing solution according to the present invention should desirably be controlled to 0.1 to 10, preferably 2 to 9, more preferably 4 to 8.5.

The processing temperature during stabilizing processing may preferably be 15° C. to 60° C., and lower by 3° C. or more, preferably 5° C. or more, than that in the color developing tank, more preferably within the range of from 20° C. to 38° C. The processing time should preferably be as short as possible from the viewpoint of rapid processing, but generally from 20 seconds to 10 minutes, preferably from 20 seconds to 3 minutes. In the case of a multi-tanks stabilizing processing, the tanks in the preceding stages should desirably be processed within a short period of time, and those in the later stages for a long time. Particularly, it is desirable to process successively the tanks with a processing time increased longer by 20% to 50% than the preceding tank. It is also preferred to employ a countercurrent system in which the stabilizing processing step is made to consist of multi-stage tanks, the supplemental solution is supplemented from the last stage tank and permitted to overflow successively into the preceding tank, because the amount supplemented can be small. After the stabilizing processing of the present invention, no water washing processing is required at all, but it is also possible to perform optionally rinsing or surface washing, etc. with a small amount of water within a very short time, if desired.

When the stabilizing processing is to be performed directly subsequent to the bleach-fixing processing step substantially without passing through the water washing step, there may be provided the silver recovery step for a short time for recovery of silver or the rinsing step with pooled water between the breach-fixing tank and the stabilizing tank. Also, after the stabilizing processing, there may be provided a water draining bath containing a surfactant, etc., but preferably no such silver recovery tank, rinsing and water draining bath should be provided. These additive processing can be applied by spraying or coating.

Processing of the present invention may be conducted also while permitting said stabilizing solution to be in contact with ion-exchange resins. This means contact by way of direct placement of ion-exchange resins in a bag, etc. into the stabilizing tank where a light-sensitive material is processed or contact of the stabilizing solution with ion-exchange resins in a bag made of chemical fibers, etc. through a resin column or a filter case connected directly to the stabilizing tank. Also, after contact of the overflowed stabilizing solution of the present invention with ion-exchange resins, at least a part of the treated solution can be used as said stabilizing solution. This means that the stabilizing solution is taken out from the stabilizing tank, permitted to contact ion-exchange resins separately from the stabilizing tank by the column method or the mixing method, and thereafter a part thereof is charged back into the stabilizing tank. In this case, although charging into the stabilizing tank may be done as the supplemental solution, but it is preferred to recycle the solution after ion-exchange treatment through a circulation system independently of the supplementing system. Also, the stabilized discharged solution thus regenerated can also be charge into the bleach-fixing tank.

While contact with ion-exchange resins may be performed in any tank in the case of a multi-tanks stabilizing bath, but it is preferred to process the treatment in the tank immediately after the bleach-fixing processing. Further preferably, this treatment should be conducted in two or more tanks, particularly preferably in all of the tanks.

A preferred embodiment in the case of the stabilizing bath having one tank is to effect contact with ion-exchange resins placed in a resin column connected to the stabilizing tank. A preferred embodiment in the case of the stabilizing bath having two tanks is to effect contact with ion-exchange resins placed in a resin column or a filter case which is connected directly to the first tank immediately after the bleach-fixing processing, more preferably contact being effected similarly in the second tank. A preferred embodiment in the case of the stabilizing bath having three or more tanks is to effect contact in the first tank immediately after the bleach-fixing processing similarly as described above, more preferably contact being effected similarly in respective columns with ion-exchange resins columns or filter cases directly connected thereto. As described above, it is most preferred to permit the stabilized solution with ion-exchange resins directly connected to the stabilizing tank. However, when no space can be taken for installation of such a resin column or filter case in an automatic processing machine, it is also possible to permit the stabilizing solution taken out from the stabilizing tank forcibly by increasing overflow or the amount supplemented to contact ion-exchange resins, followed by charging back into the stabilizing bath. When the stabilizing bath consists of one tank, the stabilizing solution taken out is permitted to contact ion-exchange resins by use of a resin column, and then the stabilized solution after contact is charged back into the stabilizing tank. In this case, the stabilizing solution after contact should preferably be added with stabilizing components. When the stabilizing bath consists of two or more tanks, it is desired to bring the stabilizing solution from the foremost tank near the bleach-fixing processing step into contact with ion-exchange resins by use of an overflow and a resin column and then return the treated solution into the stabilizing tank to the more dried side. In this case, stabilizing solution components should be added into the solution to be returned. While it is possible to use the stabilizing solution after contact with ion-exchange resins as the supplemental solution, it is desirable in this case to add stabilizing solution components thereto.

The above ion-exchange resins should preferably be brought into contact with the bleach-fixing solution after contact with the stabilizing solution, followed by regeneration. In particularly, in the case of anion exchange resins, silver recovery may be possible in regeneration of resins to give a great effect.

The present invention has been described above by referring to the case where the stabilizing solution is permitted to contact with ion-exchange resins, which, however, is not limitative of the present invention, but electrodialytic treatment (see Japanese Patent Application No. 96352/1984) or reverse osmosis treatment (see Japanese Patent Application No. 96350/1984), etc. may also be applicable.

In the present invention, a conditioning tank may also be provided after the color developing processing as described above, said conditioning tank being employed for stopping development to promote bleaching reaction and serving to preventing entrainment of a developing solution into the bleach-fixing solution to make smaller its adverse effect. In said conditioning tank, for example, a bleaching accelerator and a buffer agent may be contained. As said bleaching accelerator, there may generally be employed organic sulfur compounds, including mercapto compound and thion compounds. Further, acid or alkali agents such as acetic acid, citric acid, succinic acid, sulfuric acid, sodium hydroxide, etc. may be used for controlling pH of the conditioner. These bleaching accelerators or buffer agents may be added in amounts of 0.001 g to 100 g per liter of the conditioner. Other than the above additives, chelating agents, etc. may also be added. This conditioning tank is also preferred to be constituted so as to afford a processing solution volume of not more than 50 liters.

In the following, the stabilizing solution for negative to be used when the light-sensitive material to be processed is for negative.

In the stabilizing solution for negative, for improvement of storability of photographic image, an aldehyde derivative is added.

The aforesaid aldehyde derivative is an aldehyde compound or an aldehyde adduct represented by the formulae (1), (2) or (3) shown below, and at least one selected from among these is used. By addition of these compounds, stabilization of the dye image and improvement in physical properties of the light-sensitive material can be effected.

$R_1—CHO$ Formula (1):

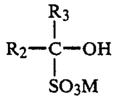
Formula (2):

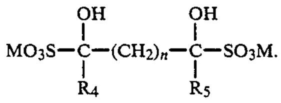
Formula (3):

In the above formulae, $R_1$ represents a hydrogen atom, an alkyl group having 1 to 5 carbon atoms, a formyl group, an acetyl group, an acetonyl group, a hydroxy group, or an alkyl group having 1 to 5 carbon atoms which may be substituted with an alkoxy group, a formyl group, an amino group, a hydroxyimino group, a halogen atom, etc. $R_2$ represents a hydrogen atom or an alkyl group having 1 to 5 carbon atoms, $R_3$ an alkyl group having 1 to 5 carbon atoms which may be substituted, M an alkali metal, $R_4$ and $R_5$ each a hydrogen atom or an alkyl group having 1 to 5 carbon atoms which may be substituted, and n an integer of 0 to 4.

Specific examples of the compounds represented by the above formulae are enumerated below, which are, however, not limitative of the invention.

[Exemplary compounds represented by the formula (1)]

1. Formaldehyde
2. Acetaldehyde
3. Propionaldehyde
4. Isobutyraldehyde
5. n-Butyraldehyde
6. n-Valeraldehyde
7. iso-Valeraldehyde
8. Methylethylacetaldehyde
9. Trimethylaldehyde
10. n-Hexaaldehyde
11. Methyl-n-propylaldehyde
12. iso-Hexaaldehyde
13. Glyoxal
14. Maonaldehyde
15. Succinicaldehyde
16. Glutaraldehyde
17. Adipaldehyde
18. Methylglyoxal
19. Acetoaceticaldehyde
20. Glycolaldehyde
21. Ethoxyacetoaldehyde
22. Aminoacetaldehyde
23. Betainaldehyde
24. Chloral
25. Chloroacetaldehyde
26. Dichloroacetaldehyde
27. Bromal
28. Dibromoacetaldehyde
29. Iodoacetaldehyde
30. α-Chloropropionacetaldehyde
31. α-Bromopropionacetaldehyde

[Exemplary compounds represented by the formula (2)]

1. Formaldehyde sodium bisulfite
2. Acetaldehyde sodium bisulfite
3. Propionaldehyde sodium bisulfite
4. Butyraldehyde sodium bisulfite

[Exemplary compounds represented by the formula (3)]

1. Succinicaldehyde sodium bisulfite
2. Glutaraldehyde bis-sodium bisulfite
3. β-Methylglutaraldehyde bis-sodium bisulfite
4. Maleicdialdehyde bis-sodium bisulfite.

The compounds represented by the above formulae should preferably be used in amounts within the range of from 0.01 to 50 g per liter of the stabilizing solution for negative, more preferably from 0.05 to 20 g, to obtain good results.

In the stabilizing solution for negative as described above, various kinds of additives can be added, if desired. For example, there may be added as desired, for improvement or expansion of processing effects, droplet irregularity preventive such as siloxane derivatives, etc.; pH controllers such as boric acid, citric acid, phosphoric acid, acetic acid, sodium hydroxide, sodium acetate, potassium citrate, etc.; fill hardeners such as potassium alum, chromium alum, etc.; organic solvents such as methanol, ethanol, dimethyl sulfoxide, etc.; humidity controllers such as ethylene glycol, polyethylene glycol, etc.; and other tone controllers.

The stabilizing solution for negative as described above may also be divided into two or more sections similarly as the stabilizing solution as described above in order to elongate the countercurrent flow pathway. Preparation of the supplementing solution, the amount to be supplemented and the processing temperature are the same as in the stabilizing solution as described above.

Also, in the present invention, a stilbene type fluorescent whitening agent can be used in the color developing solution for color paper or the stabilizing solution, and such fluorescent whitening agents including the compounds represented by the formula (4) shown below:

Formula (4):

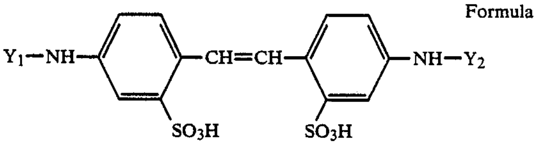

In the above formula, $Y_1$ and $Y_2$ each represents a group of the formula:

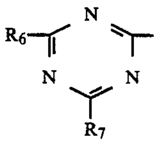

or a group

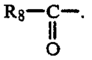

Here, each of $R_6$, $R_7$ and $R_8$ represents a hydroxyl group, a halogen atom such as chlorine, bromine, etc., a morpholino group, a substituted or unsubstituted alkoxy group (e.g. methoxy, ethoxy, methoxyethoxy, etc.), a substituted or unsubstituted, aryloxy group (e.g. phenoxy, p-sulfophenoxy, etc.), a substituted or unsubstituted alkyl group (e.g. methyl, ethyl, etc.), a substituted or unsubstituted aryl group (e.g. phenyl, methoxyphenyl, etc.), an amino group, a substituted or unsubstituted alkylamino group (e.g. methylamino, ethylamino, propylamino, dimethylamino, cyclohexylamino, β-hydroxyethylamino, di(β-hydroxyethyl)amino, β-sulfoethylamino, N-(β-sulfoethyl)-N-methylamino, N-(β-hydroxyethyl)-N-methylamino, etc.).

The fluorescent whitening agent represented by the above formula (4) may be used in an amount within the range of from 0.2 to 10 g, preferably from 0.5 to 3.0 g, per liter of the stabilizing solution.

EXAMPLE

The present invention is described below by referring to the drawings.

Figure 9:
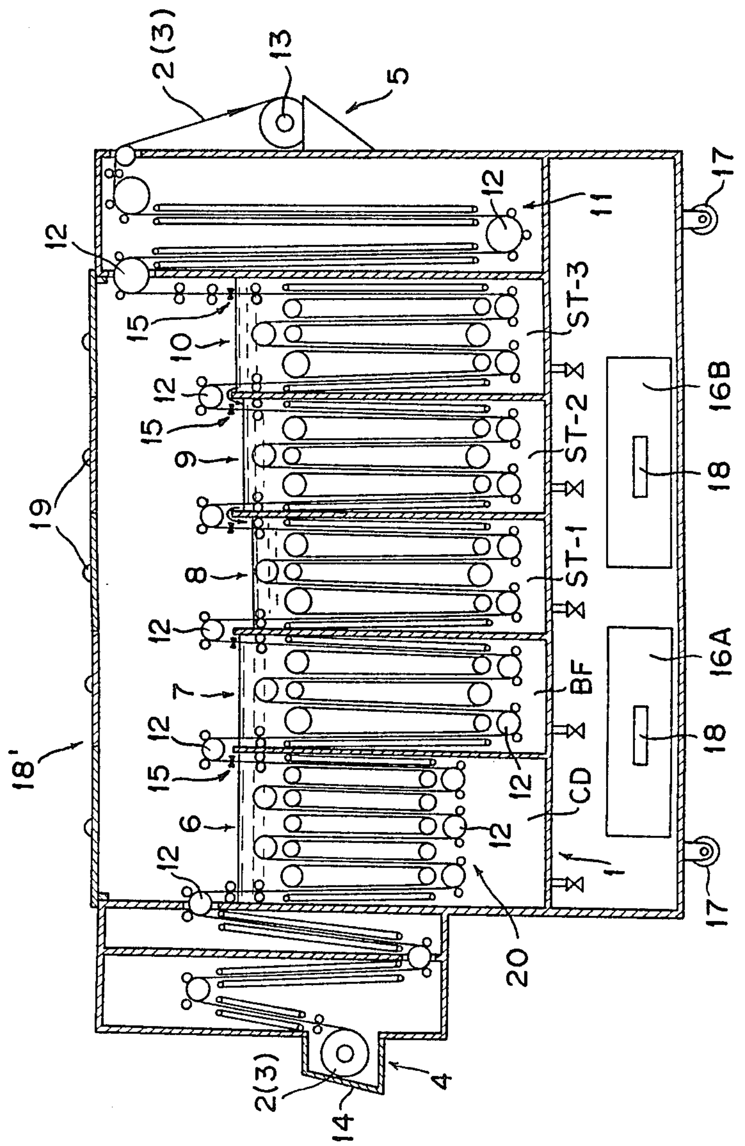
FIG. 9 is a cross-sectional view of the essential part of an automatic processing machine showing an example when the tank constitution shown in the above

FIG. 9 is a cross-sectional view of the essential part of the automatic processing machine exhibiting an example when the tank constitution as shown in the above example 3 is practiced.

In FIG. 9, on the front side of the processing machine body 1, there are provided a feeding section 4 for feeding an exposed but undeveloped color negative film (negative light-sensitive material) 2 or a color paper (positive light-sensitive material) 3, and, on the rear side, a take-out section 5 for taking out the processed light-sensitive materials 2 and 3, respectively.

Between the feeding section 4 and the take-out section 5, namely within the processing machine body, there are disposed successively adjacent to each other a color developing tank 6, a bleach-fixing tank 7, a first stabilizing tank 8, a second stabilizing tank 9, a third stabilizing tank 10 and a drying section 11.

At the respective processing tanks 6, 7, 8, 9 and 10, and at the drying section 11, there are arranged a number of guide rollers 12, respectively.

Along the guide rollers 12, a conveying guide is provided so as to convey light-sensitive materials, by which the light-sensitive material 2 or 3 can be conveyed. In this respect, it is preferred to employ the cross-over system as described in Japanese Utility Model Publication No. 27875/1980. In FIG. 9, 13 shows the wind-up section for the light-sensitive material 2 or 3. In the above feeding section 4, there is disposed a holding section 14, at which holding section 14 is set the exposed but undeveloped light-sensitive material 2 or 3.

The above-mentioned color developing tank 6, the bleach-fixing tank 7, the first stabilizing tank 8, the second stabilizing tank 9 and the third stabilizing tank 10 are constituted as shown in FIG. 3. That is, the color developing tank 6 is filled with the color developing solution as mentioned above, and the respective processing tanks 7, 8, 9 and 10 which are disposed at the next steps of the color developing tank 6 are also filled with the respective processing solutions as described above. Supplemental solutions for the respective tanks may be fed as shown in FIG. 3 as described above. In particular, the first, the second and the third stabilizing tanks 8, 9 and 10 for stabilization are changed in liquid surface levels connected to each other so that the overflow may flow according to the counter-current system from the third tank to the first tank, from the second tank to the first tank. And, the overflow solution from the third tank 10 is discharged out of the tank from the first tank 8. Of course, the stabilizing tank may be constituted of either one tank or two tanks, but the multi-tanks counter-current system has the advantage of high stabilizing efficiency with a small amount of supplmenting solution.

In FIG. 9, 15 shows a blade or squeezing section with the use of a pyramid type blade plate, etc., which prevents effectively bringing of the solution from the preceding tank to the next tank.

In this example, 16A and 16B show discharged solution recovery tanks which are provided detachably at the bottom portion of the developing body 1, the discharged solution recovery tank 16A containing the overflow discharged solution from the color developing tank 6 stored therein, while the discharged solution recovery tank 16B containing the overflow discharged solutions from the bleach-fixing tank 7 and the first stabilizing tank 8 stored therein.

The discharged solution recovery tanks 16A and 16B may be connected to pipes for overflow discharge solutions in any desired manner such as the natural falling, etc., but it is preferred to accomodate the arrangement so that the discharged solutions from said overflow discharged solution pipes will not drip off by, for example, the action of valves, etc., when the discharged solution recovery tanks 16A and 16B are withdrawn for exchange, etc. The discharged solution recovery tanks 16A and 16B may also have, in addition to openings for receiving the above overflow discharged solution pipes, openings for use of silver recovery or other purposes (these openings are equipped with lids).

The volumes of the discharged solution recovery tanks 16A and 16B may preferably be such that only one recovery per one week is required when running the automatic developing device every day, but there is no particular limitation in this respect. It is also possible to provide a detecting section and an alarm or a display section, which can detect (through detection of weight, liquid level or the position of the discharged solution recovery tank) and generates buzzer or alarm, or make a display, when a certain amount of solution is stored. In this Figure, 17 shows a caster and 18 a knob for the discharged solution recovery tank.

In FIG. 9, 18′ is a large scale lid for making the respective processing tanks 6–10 in a sealed system, while 19 shows a small scale lid provided above the respective tanks 6–10 of said large scale lid 18′.

Reference numeral 20 is a means for conveying light-sensitive materials according to the short leader system, or the leader or roller transport system.

In this example, with the processing solution volumes in the CD tank being 25 liters, in the BF tank 15 liters and in each of ST-1–ST-3 15 liters, 100 m on an average per day of E-size roll paper was processed. During the running, amounts of processing solutions supplemented were made as follows. That is, per 100 $cm^2$ of color paper, CD supplemental amount was made 2 ml, BF supplemental amount 1 ml and ST supplemental amount 2 ml.

After processing, the color developing solution in CD tank was sampled and the concentration of ferric salts of aminopolycarboxylic acid was measures to find that it was only 1 ppm.

Next, for comparative purpose, the endless belt system was used in place of the above roller transport system, and the amount each of CD and ST supplemented increased to 3 ml, with BF amount supplemented being unchanged. Nevertheless, the concentration of ferric salts of aminopolycarboxyic acids was as much as 10 ppm as an iron ion and a tar was generated in the color developing solution.

For silver recovery of soluble salts contained in the discharge solution in the discharged solution recovery tank 16B, there may effectively be employed, for example, the electrolytic method (as disclosed in French Pat. No. 2,299,667), the precipitation method (as disclosed in Japanese Provisional Patent Publication No. 73037/1977, German Pat. No. 23 31 220), the ion-exchange method (as disclosed in Japanese Provisional Patent Publication No. 17114/1976, German Pat. No. 25 48 237) and the metal substitution method (as disclosed in U.K. Pat. No. 1,353,805). Further, in silver recovery, the above soluble silver salts may be recovered according to the above methods after recovery of the overflow solution of the processed solution, and the remaining solution may be either disposed as waste solution or used as the supplemental solution or the tank processing solution with addition of a regenerating agent.

Figure 10:
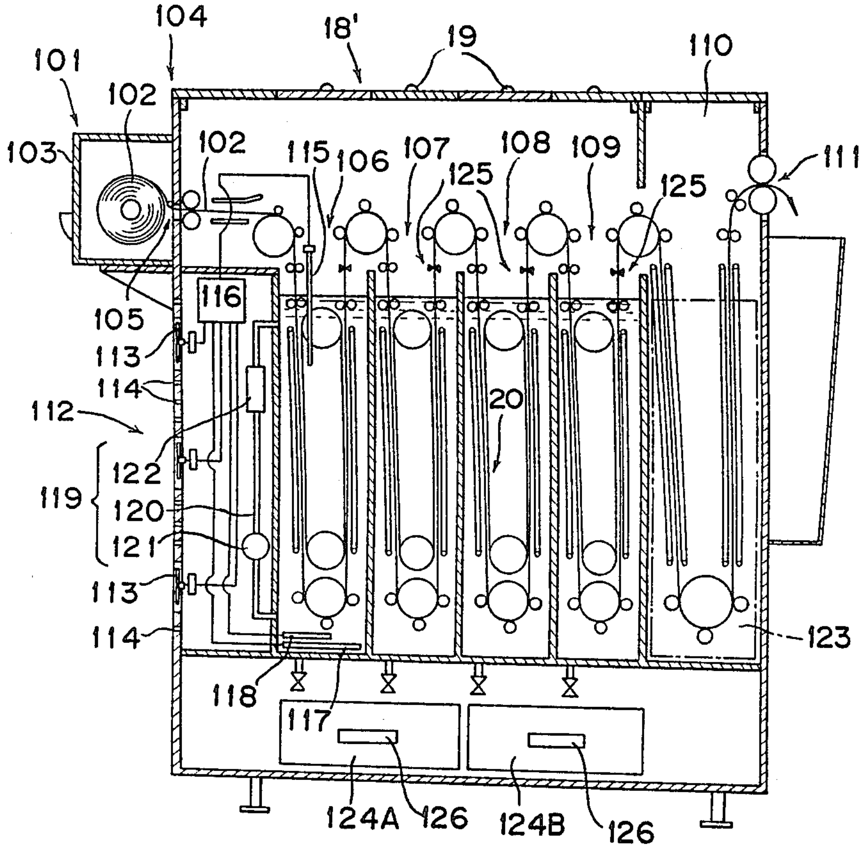
FIG. 10 is a cross-sectional view of the essential part of an example of an automatic processing machine for color negative film according to the present invention.

Next, an example in which the processing tank arrangement as shown in FIG. 4 as mentioned above is practiced is to be explained by referring to FIG. 10. This example also shows the example in which even the water pipeline for cooling is omitted.

That is, FIG. 10 is a cross-sectional view of the essential part showing one example of the automatic processing machine for color negative film according to the present invention, in which those with the same numerals as in FIG. 9 show the same members of said numerals.

In this Figure, 101 is a section for mounting a magazine housing a roll having a color negative film completed of photographing wound up connected thereto, and is provided on the side wall of the automatic processing machine body 104.

The color negative film 102 in the film magazine mounted on the mounting section 101 enters through the body inlet section 105 into the body 104, subjected automatically to developing processing through the color developing tank 106, the bleach-fixing tank 107, the first stabilizing tank 108 and the second stabilizing tank 109, then dried in the drying section 110 (having an openable lid), taken out from the body outlet 111, followed by other steps such as cutting, to be made into a product.

The color developing tank 106, the bleach-fixing tank 107, the first stabilizing tank 108 and the second stabilizing tank 109 are arranged successively in parallel as shown in the Figure, rollers for conveying negative films are provided in respective tanks and desired processings are performed while dipping the negative film 102 in solutions. The respective tanks 106–109 are provided with openable lids 19, etc. for prevention of penetration of dust, etc.

The automatic processing machine of this example is provided with a cooling chamber 112 adjacent to the color developing tank 106. Said cooling chamber 112 is provided at its outer wall a fan 113 with an appropriate number of through-holes 114 for introduction of outer air excavated. Said cooling chamber 112 also functions as the controlling system instrument chamber, in which a controlling section 116 is housed. Said controlling section 116 performs temperature control for heating by controlling ON-OFF of a large capacity electric heater 117 and a small capacity electric heater 118 by the input signal of the liquid temperature in the color developing tank detected by a temperature sensor 115, and also performs temperature control for cooling by controlling ON-OFF of the fan 113.

In this regard, automatic processing machines of the prior art had only the large capacity electric heater 117 as the heating system, and employed a cooling means using water as the cooling medium with provision of a tap water pipeline at the hose provided near the bottom of the color developing tank 106. In this prior art example, when the volume of the color developing tank 106 is 20 liters, about 1000 liters of tap water is required for maintaining the color developing tank 106 at 38° C. during running (about 12 hours).

Whereas, according to this example, when the outer temperature is 25° C., only by rotating 3 ventilating fans 113, the liquid temperature in the color developing tank 106 could be maintained at a temperature range of 38° C.±0.15° C. during running time (about 12 hours). Thus, according to this example, the cooling water as employed in the prior art example can be omitted. No tap water piping is also required. In the heating system in said example, in preparation of start-up, the liquid tempeature was elevated up to 38° C. by means of the large capacity electric heater 117 (and the small capacity electric heater 118), and the liquid temperature control performed by means of the small capacity electric heater 118 during running processing. And, for the cooling system, the three fans 113 were continued to be actuated during running.

In FIG. 10, 119 is a liquid circulating stirring apparatus having the controlling system instrument chamber functioning also as the cooling chamber 112 housed therein, and comprises a liquid delivering pump 121 and a filter for liquid cleaning 122 in the course of the passage 120 connecting the upper part and the lower part of the color developing tank 106. The position at which the fan 113 is mounted is not limited to that of this example, but it may also be on the ceiling side, etc. 125 shows a blade or squeezing section such as a pyramid type blade plate, which prevents effectively bringing of liquid from the previous bath into the next bath.

In FIG. 10, 123 shows a drying section and 126 a knob of discharged solution recovery tank.

Whereas, in this example, 124A and 124B show discharged solution recovery tanks, and into one of the tanks 124A, the color developing solution and the second stabilizing solution are permitted to flow, while the bleach-fixing solution and the first stabilizing solution into the other tank 124 B.

The first stabilizing tank 108 of this example contains a stabilizing solution which is endowed with stabilization of images and fungi-proof effect, which is provided primarily for the purpose of a desalting bath. On the other hand, the second stabilizing tank 109 is a processing bath containing a surfactant and formalin, etc. which is provided for the purpose of preventing droplet irregularity contamination. In this case, there may also be employed a solution added only with a surfactant.

Also, in this example, when the concentration of ferric salts of aminopolycarboxylic acids was measured similarly as the example shown in the above-mentioned FIG. 9, similar results to the above example were obtained, including the results of the endless belt system for comparative purpose.

According to the present invention, in an automatic processing machine for light-sensitive color photographic material having a color developing tank as the foremost tank of the processing tanks and a stabilizing tank as the last tank of the processing tanks, it has been constituted to have a system for conveying light-sensitive materials without bringing the stabilizing solution components filled in the above stabilizing tank into the color developing solution filled in the above color developing tank. Therefore, the technical task of the present invention as mentioned above can be solved as a matter of course, and moreover no requirement for piping, no discharging of waste solutions of processing and its small size will result in exhibiting such effects that it can be installed on a floor of higher stage and also be moved, if necessary.

We claim:

1. A dipping type automatic processing machine for a light-sensitive color photographic material, comprising:

a plurality of processing tanks including a color developing tank containing a color developing solution as the foremost tank of the processing tanks, at least one fixing tank containing a fixing solution, and a stabilizing tank containing a stabilizing solution as the last tank of the processing tanks, said processing tanks comprising at least one divided tank;

at least two discharged solution recovery tanks, one of which is a tank for storing discharged solution from said color developing tank and the other of which is a tank for storing discharged solutions from the said fixing tank and said stabilizing tank in a mixture;

conveying means for conveying a light-sensitive material from one processing tank to a next processing tank, said conveying means excluding an endless belt-type conveyor so as not to bring stabilizing solution components from said last stabilizing tank into the color developing solution contained in said foremost color developing tank; and at least one of said at least two discharged solution recovery tanks being arraned for storing overflow solution from siad processing tanks.

2. An automatic processing machine for a light-sensitive color photographic material according to claim 1, wherein the stabilizing tank contains a stabilizing solution other than pure water.

3. An automatic processing machine for a light-sensitive color photographic material according to claim 1, wherein said fixing tank contains a bleach-fixing solution.

4. An automatic processing machine for a light-sensitive color photographic material according to claim 1, wherein said divided tanks have a volume of processing solution of 50 liters or less, respectively.

5. An automatic processing machine for a light-sensitive color photographic material according to claim 1, wherein a volume ratio of the solutions of the color developing tank, the fixing tank and the stabilizing tank is 1 to 2.5:1:1 to 3.

6. An automatic processing machine for a light-sensitive color photographic material according to claim 1, wherein said conveying means for conveying said light-sensitive material comprises a short leader system.

7. An automatic processing machine for a light-sensitive color photographic material according to claim 1, wherein said conveying means for conveying said light-sensitive material comprises a leader system.

8. An automatic processing machine for a light-sensitive color photographic material according to claim 1, wherein said conveying means for conveying said light-sensitive material comprises a guide roller transport system.

9. An automatic processing machine for a light-sensitive color photographic material according to claim 5, wherein said fixing tank contains a bleach-fixing solution.

10. An automatic processing machine for a light-sensitive color photographic material according to claim 1, wherein said color developing tank has no heat-exchange type cooling device with tap water, and wherein said fixing tank contains a bleach-fixing solution.

11. An automatic processing machine for a light-sensitive color photographic material according to claim 1, wherein said conveying means comprises a leader at a head end of a long light-sensitive material to be treated, and roller means for conveying said leader and said light-sensitive material through a prescribed passage.

12. An automatic processing machine for a light-sensitive color photographic material according to claim 11, wherein said roller means includes means for pushing out said light-sensitive material through said prescribed passage.

13. An automatic processing machine for a light-sensitive color photographic material according to claim 11, wherein said roller means includes means for pulling said light-sensitive material through said prescribed passage.

14. An automatic processing machine for a light-sensitive color photographic material according to claim 1, wherein said conveying means comprises roller means for guiding said light-sensitive material through a prescribed passage without providing a leader at a head end of a long light-sensitive material to be treated.

15. An automatic processing machine for a light-sensitive color photographic material according to claim 14, wherein said roller means includes means for pushing out said light-sensitive material through said prescribed passage.

16. An automatic processing machine for a light-sensitive color photographic material according to claim 14, wherein said roller means includes means for pulling said light-sensitive material through said prescribed passage.

17. An automatic processing machine for a light-sensitive color photographic material according to claim 8, wherein said guide roller transport system comprises a plurality of conveying guide rollers provided in each of said processing tanks, and a conveying guide member extending between a pair of said conveying guide rollers in each of said processing tanks; and a plurality of guide rollers, at least some of said guide rollers being located in said processing tanks, and at least some of said guide rollers being located above a solution level in said processing tanks for conveying said light-sensitive material from one processing tank to a next processing tank.

18. An automatic processing machine for a light-sensitive color photographic material according to claim 11, wherein said conveying guide rollers and said conveying guides are submerged below the solution level in said respective processing tanks.

19. An automatic processing machine for a light-sensitive color photographic material according to claim 15, further comprising wiper means adapted to wipe solution from said light-sensitive material as it leaves a processing tank to prevent solution from a processing tank from being conveyed to a next processing tank.

20. An automatic processing machine for a light-sensitive color photographic material according to claim 1, using no washing water for said colaor photographic material.

* * * * *